March 18, 1969     W. B. THOMPSON     3,433,127
POWER STEERING SYSTEM WITH HYDRAULIC REACTION
Filed Dec. 30, 1966
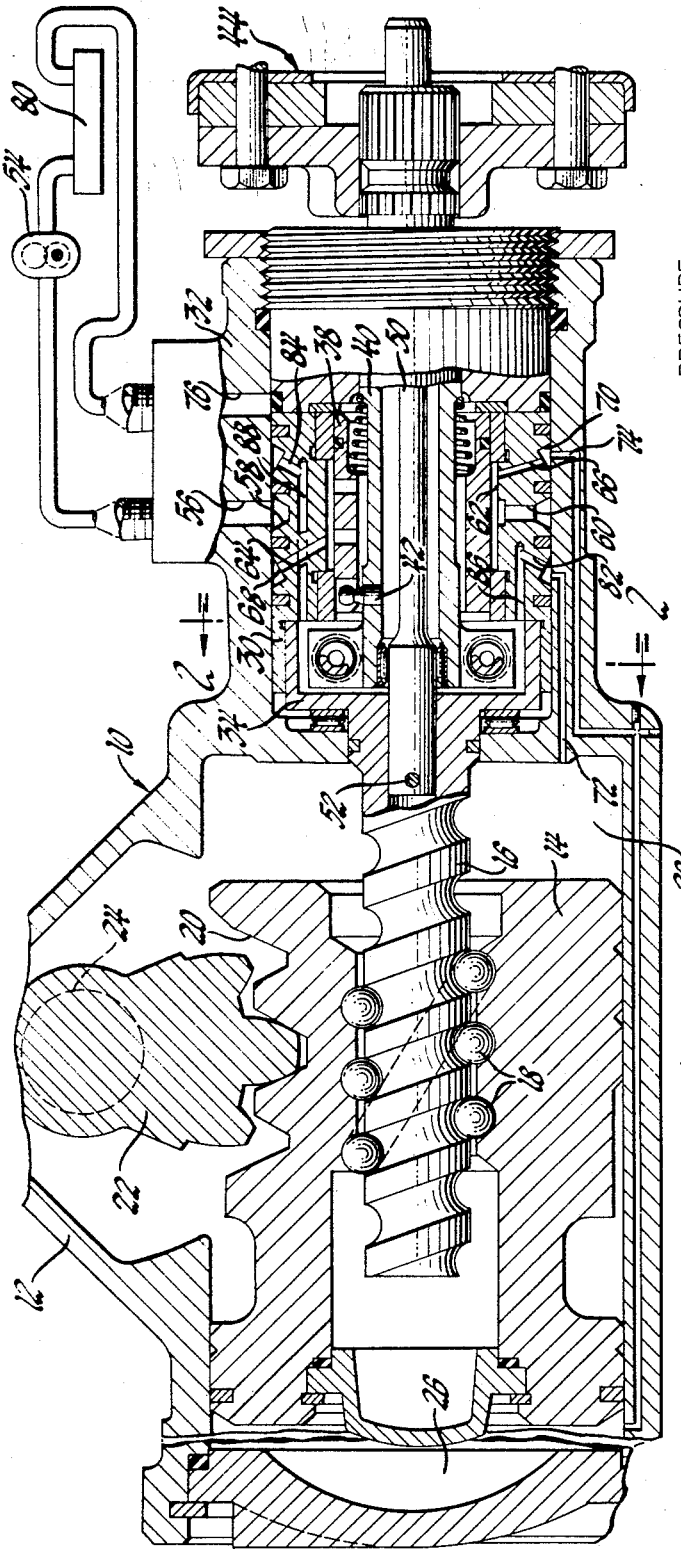
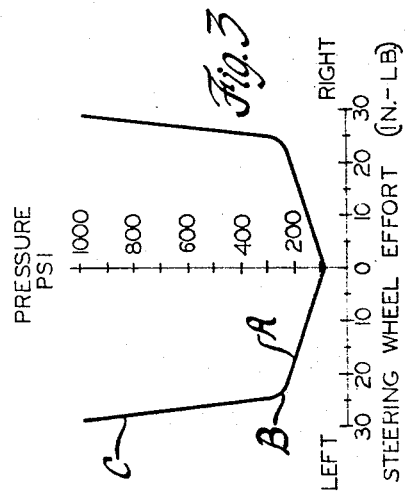
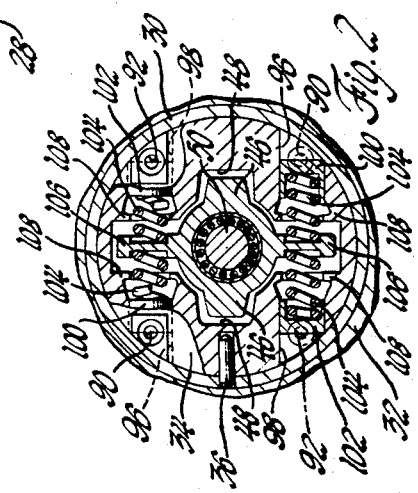
INVENTOR.
William B. Thompson
BY
D. L. Ellis
ATTORNEY

United States Patent Office 3,433,127
Patented Mar. 18, 1969

3,433,127
POWER STEERING SYSTEM WITH HYDRAULIC REACTION
William B. Thompson, Frankenmuth, Mich., assignor to General Motors Corporation, Detroit, Mich., a corporation of Delaware
Filed Dec. 30, 1966, Ser. No. 606,328
U.S. Cl. 91—372　　　　　　　　　　　6 Claims
Int. Cl. F15b 9/10

ABSTRACT OF THE DISCLOSURE

A servo assist system for automotive vehicle steering includes a servomotor, a control valve having a pair of valve members adapted upon relative movement therebetween to control flow of pressurized fluid to the servomotor, and a set of hydraulic reaction pistons communicated with the pressurized fluid directed to the servomotor and operative through compression springs to oppose the control input movement applied between the valve members to provide proportional "feel" at the steering wheel. Stops are provided to limit the reaction by the pistons at a predetermined system pressure, above which the reaction or "feel" imparted to the steering wheel undergoes transition to a second lesser proportional rate of reaction derived from the deformation rate of the compression springs.

---

In automotive vehicle hydraulic steering gear, it has been found desirable to apply hydraulic reaction or "feel" to the steering wheel operating proportoinately with the amount of steering wheel input up to a predetermined value; which value is normally selected arbitrarily as the point above which the vehicle operator would consider there to be an objectionable amount of required steering wheel input to maneuver the vehicle. Past hydraulic reaction arrangements have provided for this operational limit by the use of hydraulic pressure relief in the reaction portion of the fluid system. The relief arrangement puts additional cost into the power steering unit and may otherwise be objectionable in that it does not continue proportional "feel" above the predetermined system relief pressure.

One feature of this invention is that it provides hydraulic steering reaction or "feel" including a first rate of hydraulic proportional reaction operative up to a predetermined system pressure, and thereafter a second or lesser rate of "feel" which is also proportional to the steering wheel input. Another feature of this invention is in the limiting of the hydraulic reaction without the need for pressure relief apparatus in the steering gear. Another feature of this invention is in the use of hydraulic reaction means including hydraulic reaction pistons operative to impart pressure force between the relatively movable valve members of a steering control valve in opposition to the input control motion therebetween up to a specified system pressure, further proportional reaction or "feel" above this system pressure being provided by resiliently deformable means interposed between the reaction pistons and one of the valve members. Another feature of this invention is in the arrangement of the reaction pistons and the interposed springs in a manner wherein the reaction pistons bottom in their chambers under the predetermined system pressure and ground the springs between the two valve members so that the springs are operative to apply proportional reaction at the deformation rate thereof.

These and various other features and advantages of the invention will be readily apparent from the following description and from the drawings wherein:

FIGURE 1 is a partially diagrammatic, partially broken away sectional view of a power steering system according to this invention;

FIGURE 2 is a sectional view taken generally along the plane indicated by lines 2—2 of FIGURE 1; and FIGURE 3 is a graph illustrating a typical reaction curve for a power steering system according to this invention.

Referring now partially to FIGURE 1 of the drawings, the inventive power steering system is disclosed as embodied in a so-called integral in-line automotive vehicle power steering gear unit designated generally as 10, including a housing 12 providing in one portion thereof a chamber for a servo assist piston 14 in the form of a recirculating ball nut operatively engaged with an input worm shaft 16 by a train of ball bearings 18 in a manner well-known in the art. One face of the piston 14 is formed with a rack 20 meshing with a sector 22 formed on the output or pitman shaft indicated at 24, the latter ultimately connecting with the dirigible wheel steering linkage of the vehicle. Piston 14 defines at each side thereof a pair of pressure chambers 26, 28 operative to pressurize the piston diffrentially in one direction or the other to assist manual steering input torque applied to the worm 16 for rotation of the output pitman shaft 24 in a desired direction from a neutral or wheel straight-ahead position as shown.

Reference may be had to Zeigler et al. 3,022,772 for a full description of the general type of power steering gear herein shown, and particularly for the details of construction and operation of a rotary valve opertaive for control of the hydraulic pressure fluid system supplying the pressure chambers 26 and 28. Herein, a rotary control valve conforming generally to the above-noted disclosure includes a valve sleeve 30 rotatably mounted in a portion 32 of housing 12, the sleeve being fixed for rotation with an enlarged hollow end 34 of worm 16 by means of a connecting pin 36, indicated in FIGURE 2. A valve spool 38 is rotatably mounted within a central bore of sleeve 30 by suitable bearing means and has extending through a central bore thereof an input or stub shaft 40 which is nonrotatably connected with the spool by the reception of a pin 42 in the stub shaft within a slot of the spool. The stub shaft 40 is journalled on housing portion 32 for rotation by a flex coupling 44 of known construction adapted for connection to the steering wheel shaft of the vehicle. The stub shaft 40 and spool 38 are thus rotatable as a unit by the steering wheel relative to the unit of sleeve 30 and worm 16. As used herein, the term relatively rotatable valve members includes respectively these units or respective unitary segments of the control valve which upon relative rotation provide control of the pressurization on piston 14.

As indicated in FIGURE 2, the interior end of the stub shaft 40 is provided with a pair of radial projections 46 received with predetermined clearance within respective recesses 48 formed in the end 34 of worm 16 when the stub shaft and spool 38 are in a neutral or wheel straight-ahead position relative to the worm. A torsion rod 50 extends through a central bore of the stub shaft 40 to have pin connection at 52 with the worm 16 and similar pin connection (not shown) at its other end with stub shaft 40, adjacent flex coupling 44. Torsion rod 50 is operative in well-known manner to provide centering of the stub shaft and valve spool relative to the worm and valve sleeve and to impart reaction or "feel" opposing the steering wheel input by the torsional winding up of the rod that occurs during relative rotation in either direction from the neutral position shown. Assuming sufficient reaction in the vehicle steering linkage transmitted through the pitman shaft 24, piston 14 and worm 16, the steering wheel input torque at stub shaft 40 is operative to cause such relative rotation whereby the valve sleeve and valve spool direct pressurized fluid from an engine driven pump 54 to one or the other of the chambers 26 and 28 and pressurize the piston 14 in a direction assisting the steering wheel input. While the details of the porting of the rotary valve members is sufficiently explained in the above noted Zeigler et al. patent, will be mentioned that pump 54 delivers through a pressure passage 56 in housing portion 32 to an annular groove 58 of sleeve 30, thence through radial ports 60 to an internal axial groove 62 of the sleeve cooperating with lands, not shown, on the spool 38 which direct the pressure fluid to one or the other of a pair of radial motor ports 64 and 66. These latter lead to respective outer annular grooves 68 and 70 formed at either side of the groove 58, each groove 68 and 70 communicating via respective passages 72 and 74 to respective pressure chambers 26 and 28. As one of the motor ports 64 or 66 directs pressurized fluid to its associated annular groove and pressure chamber, the other permits exhaust from the opposite pressure chamber through the respective passage 72 or 74, respective annular groove 68 or 70 and respective motor port through axial grooves and radial ports in spool 38, not shown, to communication with a return passage 76 in housing portion 32. Return pasage 76 leads to connections to the system reservoir 80 from which pump 54 draws.

As fully explained in the Zeigler et al. patent, the instant rotary valve is of the "open center" type in that fluid flows under low pressure from pump 54 through the valve to reservoir 80 when in neutral position. Further, the degree of pressure developed in either of the pressure chambers 26 and 28 is dependent upon the extent of relative rotation between the sleeve 30 and spool 38 within the limits defined by the clearances of the projections 46 within the recesses 48 in the end 34 of worm 16. Upon taking up of this clearance in either direction stub shaft 16 and its associated spool 38 are connected for rotation as a unit with worm 16 and sleeve 30 whereby to drive the pitman shaft 24 in the event of failure of pump 54.

In addition to the centering and "feel" derived from torsion rod 50, hydraulic reaction means are provided. For each annular groove 68 and 70, there is associated a respective pair of radial reaction pressure ports designated 82 and 84. Intersection each one of the pair of ports 82 in sleeve 30 is an axial passage 86, and intersecting each of the pair of radial ports 34 is an axial passage 88. Each axial passage 86 sealedly connects with an aligned axial passage 90 in the end 34 of worm 16, and each axial passage 88 connects with a similarly axially aligned passage 92. Passages 90 communicate to bored reaction chambers 96 in worm end 34, and passages 92 communicate with similar chambers 98. Each pair of chambers 96 and 98 contain pairs of reaction pistons 100 and 102 respectively. The inward end of each piston is recessed for seating therein of one end of a coil compression spring 104 having its other end seated on a radial arm 106 of stub shaft 40. In assembly of the steering gear 10, the springs 104 are in balance in the neutral relation of the stub shaft and end 34 of worm 16, pistons 100 and 102 being bottomed in their respective chambers against the surrounding annular wall of sleeve 30 in the unpressurized condition of the hydraulic system. The bores in end 34 of the worm forming the various reaction chambers are each provided with an annular shoulder 108 engageable by pistons 100 and 102.

Assuming now a vehicle left turn, the steering wheel is rotated for counterclockwise rotation of stub shaft 40 as the parts appear in FIGURE 2, thereby to direct pressurized fluid from pressure passage 56 to the annular groove 68, passage 72 and pressure chamber 28, while at the same time permitting chamber 26 to exhaust through passage 74, annular groove 70 and return passage 76 to create a pressure differential on piston 14 aiding counterclockwise rotation of worm 16. Simultaneously, pressure fluid is fed via radial ports 82, axial passages 86 and 90 to chambers 96, chambers 98 being simultaneously communicated to exhaust through passages 92, 88, radial ports 84 and annular groove 70. Pistons 100 accordingly partake of the system pressure communicated to pressure chamber 28 to react the counterclockwise rotation of stub shaft 40, thereby to produce "feel" at the steering wheel augmenting that supplied by the torsion rod 50. The opposition between the input steering wheel torque on the stub shaft and the pressurization upon the pistons 100 is applied through the respective pair of springs 104, whereby the springs deflect at the deformation or spring rate thereof to the extent reflecting the force applied therethrough. The reaction force and the resulting steering wheel effort obtaining during these conditions is illustrated in segment A of the left turn portion of FIGURE 3, which represents a typical reaction effort curve for the disclosed system.

The above described deformation of the one pair of springs 104 of course permits movement of the pistons 100 in their chambers toward the annular shoulders 108. At a predetermined system pressure yielding a known amount of deflection of the springs 104, the pistons engage the annular shoulders to limit or prevent further application to stub shaft 40 of the pressure available in the chambers 96. Continued valve displacement by rotation of stub shaft 40 causes increased system pressure which yet communicates to the chambers 96 to hold the pistons 100 on the shoulders 108, whereby the pistons ground their respective springs 104 to the worm end 34. Accordingly, at and above the system pressure corresponding to the grounding of the springs, illustrated as point B in FIGURE 3, these springs 104 proportionately react the input torque on stub shaft 40 at their spring rate so as to combine with the rate of torsion rod 50. This combined linear function or rate is shown as segment C in FIGURE 3. Cessation of input torque on stub shaft 40 of course immediately permits the return of the stub shaft and worm end 34 to neutral relation and depressurization of the chamber 28 and reaction chambers 96. The operation sequence and hydraulic pressure routing obtaining in a vehicle right turn condition, and the accompanying operation of the reaction pistons 102, is believed apparent from the foregoing.

Thus it is seen that an improved hydraulic reaction system is provided in that the proportional hydraulic reaction available for the various reaction pistons is generated over a range of system pressures up to a given value of steering wheel effort acceptable to the average vehicle operator, above which range the reaction undergoes transition into a lesser but yet proportional amount of effort requirement or "feel" at the steering wheel. Further, hydraulic reaction cutoff is accomplished without need for costly relief valving or the like.

Having thus described the invention, what is claimed is:

1. In a servo system, a source of pressurized fluid, a servomotor, a pair of valve members adapted upon relative movement therebetween to direct pressurized fluid from said source to said servomotor, means defining a reaction chamber in one of said valve members, a reaction piston located movably in said chamber, means for communicating to said chamber pressurized fluid directed to said servomotor upon relative movement between said valve members, resiliently deformable means interposed between said piston and the other of said valve members for applying the pressurization force on said piston between said valve members in a direction opposing said relative movement therebetween, said deformable means deforming under said pressurization force to permit movement of said piston in said opposing direction while applying said pressurization force, and means for limiting movement of said piston in said opposing direction and application of said pressurization force between said valve members upon reaching a predetermined pressure within said chamber at a corresponding degree of relative movement between said valve members.

2. The combination recited in claim 1 wherein said piston, at and above said predetermined pressure within said chamber, grounds said resiliently deformable means on said one valve member whereby further relative movement between said valve members is reacted by said resiliently deformable means at the rate of deformation thereof.

3. The combination recited in claim 1 wherein said limiting means includes a stop shoulder in said chamber engaged by said piston under said predetermined pressure thereon.

4. The combination recited in claim 1 wherein said valve members are rotatable relative to each other.

5. The combination recited in claim 1 wherein said resiliently deformable means are operative in compression to apply said pressurization force between said valve members.

6. The combination recited in claim 5 wherein said resiliently deformable means include a coil compression spring seated between said piston and said other valve member.

References Cited
UNITED STATES PATENTS

| | | | |
|---|---|---|---|
| 3,094,010 | 6/1963 | Folkerts | 91—372 |
| 3,099,167 | 7/1963 | Folkerts | 91—372 |

PAUL E. MASLOUSKY, *Primary Examiner.*

U.S. Cl. X.R.

91—375